United States Patent
Takahashi et al.

(10) Patent No.: US 11,378,489 B2
(45) Date of Patent: Jul. 5, 2022

(54) PROPAGATION CHARACTERISTIC ANALYSIS DEVICE AND PROPAGATION CHARACTERISTIC ANALYSIS METHOD

(71) Applicant: Nippon Telegraph and Telephone Corporation, Tokyo (JP)

(72) Inventors: Hiroshi Takahashi, Musashino (JP); Tomokazu Oda, Musashino (JP); Kunihiro Toge, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 56 days.

(21) Appl. No.: 16/975,821

(22) PCT Filed: Feb. 26, 2019

(86) PCT No.: PCT/JP2019/007253
§ 371 (c)(1),
(2) Date: Aug. 26, 2020

(87) PCT Pub. No.: WO2019/167928
PCT Pub. Date: Sep. 6, 2019

(65) Prior Publication Data
US 2020/0408636 A1  Dec. 31, 2020

(30) Foreign Application Priority Data

Feb. 28, 2018  (JP) .............................. JP2018-035867

(51) Int. Cl.
*G01M 11/02* (2006.01)
*G01M 11/00* (2006.01)
*H04B 10/2581* (2013.01)

(52) U.S. Cl.
CPC ........ *G01M 11/0285* (2013.01); *G01M 11/39* (2013.01); *H04B 10/2581* (2013.01)

(58) Field of Classification Search
CPC ............... G01M 11/39; G01M 11/319; G01M 11/0285; H04B 10/2581; H04B 10/073; H04J 14/04
See application file for complete search history.

(56) References Cited

U.S. PATENT DOCUMENTS 5,909,450 A * 6/1999 Wright ............. G01R 31/31926
714/724
7,565,084 B1 * 7/2009 Wach ................... H04B 10/564
398/201

(Continued)

FOREIGN PATENT DOCUMENTS

JP  2747565 B2 * 5/1998
JP  2017072389 A * 4/2017

OTHER PUBLICATIONS

International Search Report dated May 21, 2019, issued in PCT Application No. PCT/JP2019/007253, filed Feb. 26, 2019.

(Continued)

*Primary Examiner* — Sang H Nguyen
(74) *Attorney, Agent, or Firm* — Workman Nydegger (57) ABSTRACT

An object is to provide a propagation property analyzing apparatus that can alleviate the influence of an error caused by crosstalk, and accurately evaluate a few-mode optical fiber that multiplexes a plurality of modes, in a distributional and non-destructive manner. Provided is a propagation property analyzing apparatus that analyzes propagation properties of a few-mode optical fiber that multiplexes a plurality of modes, which is an optical fiber under test, in a lengthwise direction thereof, through Brillouin time domain analysis, the propagation property analyzing apparatus including: means for inputting probe light in a desired mode from a (Continued)

distal end of the optical fiber under test; means for inputting a light pulse that is in the desired mode and that has a frequency difference equivalent to a Brillouin frequency shift in the desired mode, relative to the probe light, from a proximal end of the optical fiber under test, as pump light corresponding to the probe light; and means for inputting a light pulse that is in another mode different from the desired mode and that has a frequency difference equivalent to a Brillouin frequency shift in the other mode, relative to the probe light, as secondary probe light corresponding to the probe light, from the proximal end of the optical fiber under test.

6 Claims, 6 Drawing Sheets (56) References Cited

U.S. PATENT DOCUMENTS

| | | | |
|---|---|---|---|
| 9,131,915 B2* | 9/2015 | Amiri Farahani | A61B 6/5258 |
| 2010/0165328 A1* | 7/2010 | Hirano | G01M 11/338 |
| | | | 356/73.1 |
| 2013/0216176 A1* | 8/2013 | Li | G01L 1/246 |
| | | | 385/12 |
| 2014/0218717 A1* | 8/2014 | Zhang | G01M 11/39 |
| | | | 356/32 |
| 2014/0306101 A1* | 10/2014 | Zornoza Indart | G01D 5/35364 |
| | | | 250/227.14 |
| 2015/0377656 A1* | 12/2015 | Bastianini | G01D 5/35364 |
| | | | 356/301 |
| 2017/0205253 A1* | 7/2017 | Handerek | G01H 9/004 |
| 2017/0254708 A1* | 9/2017 | Koizumi | G01K 11/32 |
| 2018/0023948 A1* | 1/2018 | Bennett | G01D 5/35361 |
| | | | 356/601 |
| 2018/0094987 A1* | 4/2018 | Iwamura | G01K 11/32 |

OTHER PUBLICATIONS

M. Nakazawa et al., *Measurement of Mode Coupling Distribution Along a Few-Mode Fiber Using a Synchronous Multi-Channel OTDR* Optics Express, vol. 22, No. 25, p. 31299-31309 (2014).

An Li et al., *Measurement of Distributed Mode Coupling in a Few-Mode Fiber Using a Reconfigurable Brillouin OTDR*, Optics Letters, vol. 39, No. 22, pp. 6418-6421 (2014).

H. Takahashi et al., *Distributed Measurement of Single-Way Inter-Modal Crosstalk in Spliced FMFs Based on BOTDA*, OFC 2017, Th4H.3, 3 pages (2017).

* cited by examiner

PROPAGATION CHARACTERISTIC ANALYSIS DEVICE AND PROPAGATION CHARACTERISTIC ANALYSIS METHOD

TECHNICAL FIELD

The present invention relates to a propagation property analyzing apparatus and a propagation property analyzing method, and particularly to a propagation property analyzing apparatus and a propagation property analyzing method for evaluating the propagation properties of a few-mode optical fiber (hereinafter also referred to as an "FMF") or an optical transmission system that uses the same, in a non-destructive manner.

BACKGROUND ART

In recent years, the volume of traffic passing through a backbone network has significantly increased, and it is said that large-capacity transmission on the order of P bps/core will be required in the future. In order to manage such an increase in capacity, a mode division multiplex transmission, which employs an FMF (Few Mode Fiber) that propagates a plurality of modes, has received considerable attention as an optical fiber that breaks through the limitation of the capacity of a single mode optical fiber that is used in a modern optical fiber transmission line.

An optical transmission system realized using an FMF includes, in addition to a mode multiplexing/demultiplexing device constituting an optical fiber transmission line, connection points and bending points of optical fibers in an optical cable, for example, and thus includes a plurality of mode conversion points. It is necessary to know the coupling ratio between the modes that occur at the mode conversion points, and to properly design and control the properties of a transmission line (a loss in each mode, a coupling ratio, a group delay difference, etc.) regarding the entire optical fiber transmission line.

NPL 1 proposes a method that employs an optical time domain reflectometry (hereinafter referred to as an OTDR) that has a plurality of channels, through which light in a given mode such as an LP01 mode is excited in the FMF, and based on the power ratio between Rayleigh backscattering that is generated due to the light in the aforementioned mode when the light propagates through the FMF, and Rayleigh backscattering that is generated due to the light coupled to light in a mode other than the mode of the exited light, such as the LP11 mode, the coupling ratio between the LP01 mode and the LP11 mode is evaluated in a distributional manner.

NPL 2 proposes a method that employs a Brillouin time domain reflectometry (hereinafter referred to as a BOTDR). The method proposed in this document is different from the method disclosed in NPL 1, and utilizes the fact that the Brillouin frequency shift of Brillouin backscattering that occurs relative to the frequency of the incident light is different due to the difference between the respective propagation constants of modes. NPL 3 proposes a method that employs a Brillouin time domain analysis (hereinafter referred to as a BOTDA). Unlike the method according to NPL 2, this method utilizes the fact that it is possible to generate strong stimulated Brillouin scattering only in a desired mode in an optical fiber by exciting two beams of light with different optical frequencies in the same mode.

CITATION LIST

Non Patent Literature

[NPL 1] M. Nakazawa et. al., "Measurement of mode coupling distribution along a few-mode fiber using a synchronous multi-channel OTDR" Opt. Express, Vol. 22, No. 25, p. 31299-31309 (2014).

[NPL 2] An Li et. al., "Measurement of distributed mode coupling in a few-mode fiber using a reconfigurable Brillouin OTDR" Optics Letters, Vol. 39, no. 22, p. 6418 (2014).

[NPL 3] H. Takahashi et. al., "Distributed Measurement of Single-way Inter-modal Crosstalk in Spliced FMFs Based on BOTDA" OFC2017, Th4H.3 (2017).

SUMMARY OF THE INVENTION

Technical Problem

The method disclosed in NPL 1 utilizes the Rayleigh backscattering of incident light. Therefore, intense Fresnel reflection generated on the measurement subject affects the measurement, and the method needs a special means for eliminating the Fresnel reflection. Also, regarding a given mode conversion point on the optical fiber transmission line, in addition to incident light that passes through the point when travelling in the propagation direction thereof, Rayleigh backscattering of the incident light passes through the point again when returning in the incident direction. Therefore, there is a problem in which the coupling state of modes cannot be specified at a given mode conversion point only from the power ratio between the respective modes obtained through the OTDR unless there is a premise that the mode coupling caused by Rayleigh backscattering is uniform in the lengthwise direction of the optical fiber under test.

With the method disclosed in NPL 2, it is possible to resolve the Brillouin backscattering power ratio between the respective modes on the frequency axis, with the incident light. Therefore, this method can effectively solve the problem regarding Fresnel reflection in the method disclosed in NPL 1. According to this method, the distribution, in the lengthwise direction, of the peak amplitudes of the Brillouin backscattering spectrum in the respective modes resolved on the frequency axis is calculated, the distribution, in the lengthwise direction of the optical fiber under test, of the peak amplitude ratios is plotted on the logarithmic axis, and the half of the slope thereof is defined as a mode coupling ratio. Therefore, there is a problem in that, if optical fibers having different Brillouin gain properties are used before and after a given mode conversion point, offset amounts before and after the mode conversion point are different and the mode coupling state cannot be accurately measured.

Furthermore, according to the methods disclosed in NPLs 1 and 2, the distribution of the scattered light intensities in the lengthwise direction is calculated, the distribution of the ratios of the scattered light intensities in the lengthwise direction of the measurement-subject fiber is plotted on a logarithmic axis, and a half of the slope is defined as a mode coupling ratio. Therefore, there is a problem in that, if the mode coupling ratio at a given mode conversion point has direction dependence, accurate measurement cannot be performed.

According to the method disclosed in NPL 3, it is possible to generate strong stimulated Brillouin scattering at a given position in an optical fiber, in a desired mode, and measure the mode coupling ratio received until the generated stimulated Brillouin scattering reaches a light receiver. Therefore, it is possible to measure the mode coupling ratio, including direction dependence as well. However, stimulated Brillouin scattering spectra in the respective modes are not strictly independent, and overlap each other on the frequency axis. Therefore, there is a problem in which it is impossible to generate scattering only in a desired mode, and an error occurs due to crosstalk.

The present invention has been made in view of conventional problems, and a problem to be solved by the present invention is to provide a propagation property analyzing apparatus that can alleviate the influence of an error caused by crosstalk, and accurately evaluate a few-mode optical fiber that multiplexes a plurality of modes, in a distributional and non-destructive manner.

Means for Solving the Problem

To solve the above-described problem, an aspect of the invention disclosed in one embodiment is a propagation property analyzing apparatus that analyzes propagation properties of a few-mode optical fiber that multiplexes a plurality of modes, which is an optical fiber under test, in a lengthwise direction thereof, through Brillouin time domain analysis, the propagation property analyzing apparatus including: means for inputting probe light in a desired mode from a distal end of the optical fiber under test; means for inputting a light pulse that is in the desired mode and that has a frequency difference equivalent to a Brillouin frequency shift in the desired mode, relative to the probe light, from a proximal end of the optical fiber under test, as pump light corresponding to the probe light; and means for inputting a light pulse that is in another mode different from the desired mode and that has a frequency difference equivalent to a Brillouin frequency shift in the other mode, relative to the probe light, as secondary probe light corresponding to the probe light, from the proximal end of the optical fiber under test.

Another aspect of the invention disclosed in another embodiment is a propagation property analyzing method for analyzing propagation properties of a few-mode optical fiber that multiplexes a plurality of modes, which is an optical fiber under test, in a lengthwise direction thereof, through Brillouin time domain analysis, the propagation property analyzing method including the steps of: inputting probe light in a desired mode from a distal end of the optical fiber under test; inputting a light pulse that is in the desired mode and that has a frequency difference equivalent to a Brillouin frequency shift in the desired mode, relative to the probe light, from a proximal end of the optical fiber under test, as pump light corresponding to the probe light; and inputting a light pulse that is in another mode different from the desired mode and that has a frequency difference equivalent to a Brillouin frequency shift in the other mode, relative to the probe light, as secondary probe light corresponding to the probe light, from the proximal end of the optical fiber under test.

DESCRIPTION OF EMBODIMENTS

The following describes an embodiment of the present invention in detail with reference to the drawings.

A propagation property analyzing apparatus according to the present embodiment is a propagation property analyzing apparatus that analyzes propagation properties in a lengthwise direction through Brillouin optical time domain analysis (BOTDA), using a few-mode optical fiber that multiplexes a plurality of modes as an optical fiber under test, in which crosstalk is suppressed by canceling out a Brillouin gain generated in a mode other than the desired mode, with a Brillouin loss generated in probe light by using light that is excited more strongly than the probe light as secondary probe light. The method disclosed in NPL 3 may be used as an example of Brillouin optical time domain analysis (BOTDA).

The propagation property analyzing apparatus according to the present embodiment is a propagation property analyzing apparatus that performs analysis through Brillouin optical time domain analysis (BOTDA) and additionally has three input means.

A means for inputting probe light in a desired mode from a distal end of the optical fiber under test.

A means for inputting a light pulse that is in the desired mode and that has a frequency difference equivalent to a Brillouin frequency shift in the desired mode, relative to the probe light, from a proximal end of the optical fiber under test, as pump light corresponding to the probe light.

A means for inputting a light pulse that is in another mode different from the desired mode and that has a frequency difference equivalent to a Brillouin frequency shift in the other mode, relative to the probe light, as secondary probe light corresponding to the probe light, from the proximal end of the optical fiber under test.

With this configuration, it is possible to cancel out a Brillouin gain generated due to stimulated Brillouin scattering in a mode other than the desired mode between the pump light and the probe light, with a Brillouin loss generated due to stimulated Brillouin scattering in a mode other than the desired mode between the probe light and the secondary probe light. Therefore, even if stimulated Brillouin scattering spectra in the respective modes in the optical fiber under test overlap each other, it is possible to reduce an error caused by crosstalk. As a result, it is possible to acquire an accurate mode coupling ratio at the mode conversion point without being affected by light propagation direction dependence. Furthermore, it is possible to evaluate a mode coupling ratio in an optical fiber under test or optical fiber transmission line connected to an optical output end, in a distributional and non-destructive manner.

Figure 1:
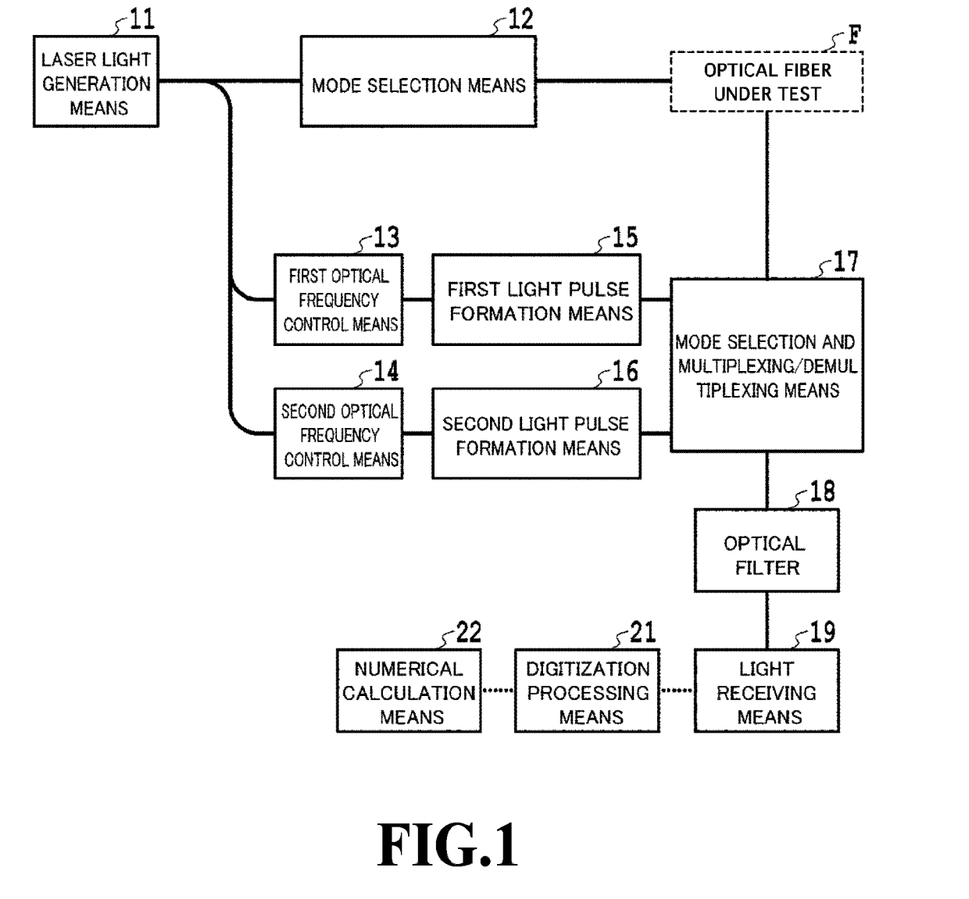
FIG. 1 is a block configuration diagram showing a first embodiment of the present invention.

FIG. 1 is a block configuration diagram showing an example of a propagation property analyzing apparatus according to an embodiment of the present invention. In the propagation property analyzing apparatus according to the present embodiment, as shown in FIG. 1, the output of a laser light generation means 11 is divided into three branches, which are respectively connected to a mode selection means 12, a first optical frequency control means 13, and a second optical frequency control means 14. The mode selection means 12 is connected to the proximal end of an optical fiber under test F. The first optical frequency control means 13 is also connected to a first light pulse formation means 15, and the second optical frequency control means 14 is also connected to a second light pulse formation means 16. The first light pulse formation means 15 and the second light pulse formation means 16 are connected to a mode selection and multiplexing means 17. The mode selection and multiplexing means 17 is also connected to the proximal end of the optical fiber under test F and an optical filter 18. The optical filter 18 is also connected to a light receiving means 19, and a digitization processing means 21 and a numerical calculation means 22, which constitutes a measurement system, are sequentially connected to the light receiving means 19.

In the propagation property analyzing apparatus according to the present embodiment, the first beam passing through the first branch of the three branches of the laser light generating means 11 is input to the mode selection means 12, in which a desired mode is selected. Thus, the first beam is used as probe light that is input to the proximal end of the optical fiber under test F.

The second branched beam is input to the first optical frequency control means 13. The input light is given a frequency difference of approximately 10 to 11 GHz on the high frequency-side, which is equivalent to a Brillouin frequency shift of the optical fiber under test F. Thereafter, the light is formed into pulses by the first light pulse formation means 15, which are used as pump light that causes Brillouin amplification with the probe light.

The third branched beam is given a frequency difference of approximately 10 to 11 GHz on the lower frequency-side, which is equivalent to the Brillouin frequency shift of the optical fiber under test F, by the second optical frequency control means 14. Thereafter, the light is formed into pulses by the second light pulse formation means 16, which are used as secondary probe light that generates a Brillouin less with the probe light.

The modes of the pump light and the secondary probe light are selected by the mode selection and multiplexing/demultiplexing means 17, and the resulting beams are input to the proximal end of the optical fiber under test F. For the pump light, the mode selection and multiplexing/demultiplexing means 17 selects the mode of the measurement subject, and for the secondary probe light, the mode selection and multiplexing/demultiplexing means 17 selects a mode different from the mode of the measurement subject. The mode selection and multiplexing/demultiplexing means 17 multiplexes the pump light and the probe light such that the pulse positions thereof do not overlap each other.

The probe light interacts with the pump light at a desired position in the optical fiber under test F and is subjected to Brillouin amplification, and is thereafter emitted from the proximal end of the optical fiber under test F, and is demultiplex by the mode selection and multiplexing/demultiplexing means 17 into beams in the respective modes.

Regarding the emitted beams in the respective modes, Rayleigh scattering components of the pump light and the secondary probe light are removed from by the optical filter means 18. Thereafter, the pump light and the secondary probe light are received by the light receiving means 19, and are converted into electrical signals. The received electrical signals are appropriately amplified, are digitized by the digitization processing means 21, and the difference with the intensity of the probe light that has not interact with the pump light is subjected to averaging processing to obtain a Brillouin gain, using the numerical calculation means 22. Thus, the propagation property analyzing apparatus according to the present embodiment analyses the propagation properties of the few-mode optical fiber.

Here, it can be said that, in the propagation property analyzing apparatus according to the present embodiment, in a state where the secondary probe light is not used, the numerical operation means 22 calculates a Brillouin gain from the light emitted from the proximal end of the optical fiber under test F when the frequency of the pump light is appropriately changed by the first optical frequency control means 13 such that the frequency difference between the probe light and the pump light changes, and thus the numerical calculation means 22 can obtain a Brillouin gain (Brillouin gain spectrum) for each frequency.

In the propagation property analyzing apparatus according to the present embodiment, the numerical calculation means 22 obtains a Brillouin gain distribution in the same manner as described above, from output light that has undergone the frequency control performed by the second optical frequency control means 14 in addition to the frequency control performed by the first optical frequency control means 13. The output light that has undergone the frequency control performed by the second optical frequency control means 14 is light emitted from the proximal end of the optical fiber under test F when the second optical frequency control means 14 appropriately changes the frequency of the secondary probe light such that the frequency difference between the probe light and the secondary probe light changes. As a result, even if the stimulated Brillouin scattering spectra in the respective modes of the optical fiber under test overlap each other in a state where the secondary probe light is not used, it is possible to remove a Brillouin spectrum that is not to be measured, and obtain a Brillouin gain spectrum at a given position in the desired optical fiber under test.

The configuration of the propagation property analyzing apparatus according to the embodiment shown in FIG. 1 is merely an example. Any means may be employed as long as the apparatus is configured such that a frequency difference that is equivalent to a Brillouin frequency shift can be given between the pump light and the probe light and the probe light and the secondary probe light and a predetermined mode can be selected and excited and a signal of a Brillouin gain intensity can be obtained in a time domain in a similar manner.

Next, the principle of the analysis method used in the propagation property analyzing apparatus according to the present embodiment will be described in more detail.

If the stimulated Brillouin scattering phenomenon that occurs in an FMF is studied, a Brillouin frequency shift $v_b$ in a given mode can be expressed by the following Formula 1.

Formula 1

$$v_b = \frac{2n_i V_a}{\lambda}$$

Formula 1

Here, $n_i$ denotes the effective refractive index of the mode, $V_a$ denotes the effective speed of the acoustic wave, and $\lambda$ denotes the wavelength in vacuum.

Formula 1 indicates that the Brillouin frequency shift in the FMF is different for each propagation mode, and Brillouin spectrum information obtained at a given position has a peak corresponding to a different frequency for each mode. It can be said that the propagation property analyzing apparatus according to the present embodiment utilizes the fact that Brillouin spectrum information has a peak corresponding to a different frequency for each mode.

For simplification, if an FMF that propagates light in two modes is considered, it can be envisaged that such an FMF has three spectrum peaks when each of the pump light and the probe light has amplitudes in both the LP01 mode and the LP11 mode. Specifically, the three spectrum peaks are a spectrum peak $v_{01\text{-}01}$ that occurs due to interaction between the pump light component and the probe light component both in the LP01 mode, a spectrum peak $v_{01\text{-}11}$ that occurs due to interaction between the pump light component in the LP01 mode and the probe light component in the LP11 mode, and a spectrum peak $v_{11\text{-}11}$ that occurs due to interaction between the pump light component and the probe light component both in the LP11 mode. Note that the spectrum peak $v_{01\text{-}11}$ also occurs due to interaction between the pump light component in the LP11 mode and the probe light component in the LP01 mode.

Figure 2:
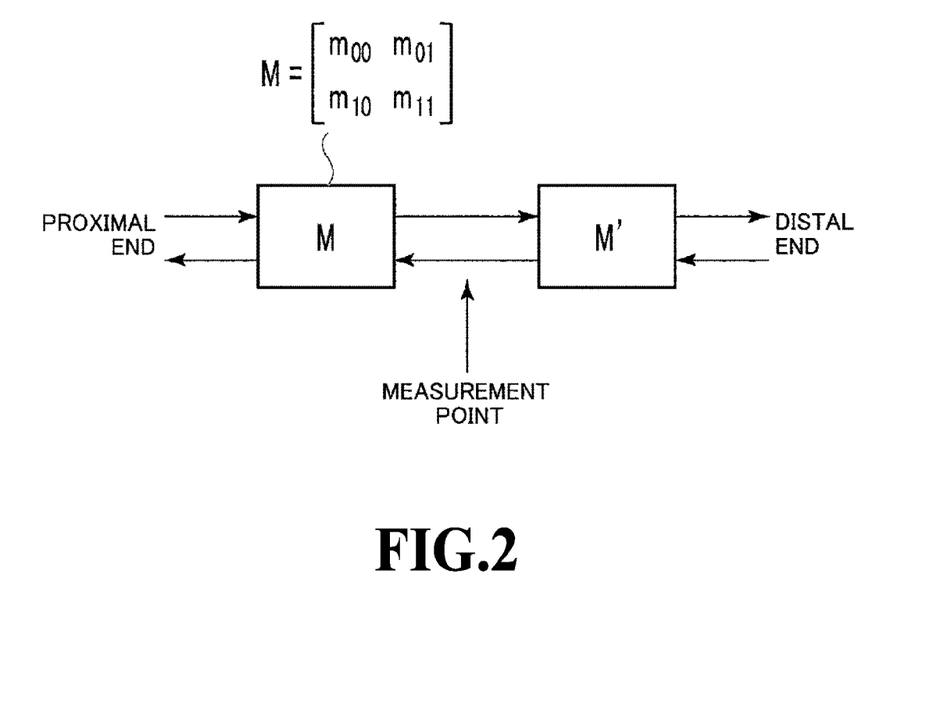
FIG. 2 is an optical fiber transmission line model diagram according to the embodiment of the present invention.

FIG. 2 is a diagram showing an optical fiber transmission line model. First, regarding the optical fiber transmission line model shown in FIG. 2, for simplification, interaction between a pump light component in a mode and a probe light component in a predetermined mode when the pump and the probe in the LP01 are input to an optical fiber under test will be studied. Note that, in the optical fiber transmission line model shown in FIG. 2, a plurality of coupling matrices are present, and therefore a plurality of mode conversion points are present. Here, the total length of the transmission line is denoted as L the positions of the mode conversion points are denoted as z, and it is assumed that mode conversion points where the coupling matrices are denoted as M are included in the transmission line.

When the powers of the pump light in the LP01 mode and the LP11 mode at measurement points in the optical fiber transmission line model shown in FIG. 2 are respectively denoted $a_0$ and $a_1$, and the power of the input probe light is denoted as $p_r$, the powers $b_0$ and $b_1$ of the probe light at the measurement points are subjected to mode conversion due to the coupling matrices M(L−z), and are expressed by the following Formula 2.

Formula. 2

$$b_0 = m_{00}(L-z)P_r$$

$$b_1 = m_{10}(L-z)P_r \qquad \text{Formula 2}$$

Here, $m_{ij}(L-z)$ denotes elements of the coupling matrices M(L−z). The probe light that has been subjected to Brillouin amplification at the measurement points due to the pump light is further subjected to mode conversion due to the coupling matrices M(z), and reaches the proximal end in the LP01 mode and the LP11 mode. When interaction between $a_0$ and $b_0$ is considered, if losses that occur at positions other than the mode conversion points are ignored, the probe light intensity observed at the proximal end in the LP01 mode is expressed by Formula 3, using Formula 2.

Formula. 3

$$m_{00}(z)g_{01\text{-}01}(v)a_0b_0 = m_{00}(z)g_{01\text{-}01}(v)a_0m_{00}(L-z)P_r \qquad \text{Formula 3}$$

Here, $g_{01\text{-}01}(v)$ denotes a gain profile with a peak at $v_{01\text{-}01}$, and $m_{ij}(z)$ denotes elements of the coupling matrices M(z).

Similarly, the probe light intensity observed at the proximal end in the LP11 mode is expressed by Formula 4.

Formula. 4

$$m_{10}(z)g_{01\text{-}01}(v)a_0b_0 = m_{10}(z)g_{01\text{-}01}(v)a_0m_{00}(L-z)P_r \qquad \text{Formula 4}$$

Therefore, the sum of the Brillouin gains at the measurement points is expressed by Formula 5, using Formulas 3 and 4.

Formula. 5

$$\{m_{00}(z)+m_{10}(z)\}g_{01\text{-}01}(v)a_0m_{00}(L-z)P_r \qquad \text{Formula 5}$$

Similarly, when interaction between $a_0$ and $b_1$ is considered, the probe light intensity observed at the proximal end in the LP01 mode is expressed by Formula 6.

Formula. 6

$$m_{01}(z)g_{01\text{-}11}(v)a_0b_1 = m_{01}(z)g_{01\text{-}11}(v)a_0m_{10}(L-z)P_r \qquad \text{Formula 6}$$

The probe light intensity observed at the proximal end in the LP11 mode is expressed by Formula 7.

Formula. 7

$$m_{11}(z)g_{01\text{-}11}(v)a_0b_1 = m_{11}(z)g_{01\text{-}11}(v)a_0m_{10}(L-z)P_r \qquad \text{Formula 7}$$

Therefore, the sum of the Brillouin gains at the measurement points is expressed by Formula 8, using Formulas 6 and 7.

Formula. 8

$$\{m_{01}(z)+m_{11}(z)\}g_{01\text{-}11}(v)a_0m_{10}(L-z)P_r \qquad \text{Formula 8}$$

Similarly, when interaction between $a_1$ and $b_0$ is considered, the probe light intensity observed at the proximal end in the LP01 mode is expressed by Formula 9.

Formula. 9

$$m_{00}(z)g_{11\text{-}01}(v)a_1b_0 = m_{00}(z)g_{11\text{-}01}(v)a_1m_{00}(L-z)P_r \qquad \text{Formula 9}$$

The probe light intensity observed at the proximal end in the LP11 mode is expressed by Formula 10.

Formula. 10

$$m_{10}(z)g_{11\text{-}01}(v)a_1b_0 = m_{10}(z)g_{11\text{-}01}(v)a_1m_{00}(L-z)P_r \qquad \text{Formula 10}$$

Therefore, the sum of the Brillouin gains at the measurement points is expressed by Formula 11, using Formulas 9 and 10.

Formula. 11

$$\{m_{00}(z)+m_{10}(z)\}g_{11\text{-}01}(v)a_1m_{00}(L-z)P_r \qquad \text{Formula 11}$$

Similarly, when interaction between $a_1$ and $b_1$ is considered, the probe light intensity observed at the proximal end in the LP01 mode is expressed by Formula 12.

Formula. 12

$$m_{01}(z)g_{11\text{-}11}(v)a_1b_1 = m_{01}(z)g_{11\text{-}11}(v)a_1m_{10}(L-z)P_r \qquad \text{Formula 12}$$

The probe light intensity observed at the proximal end in the LP11 mode is expressed by Formula 13.

$$m_{11}(z)g_{11\text{-}11}(v)a_1b_1 = m_{11}(z)g_{11\text{-}11}(v)a_1m_{10}(L-z)P_r \qquad \text{Formula 13}$$

Therefore, the sum of the Brillouin gains at the measurement points is expressed by Formula 14, using Formulas 12 and 13.

Formula. 14

$$\{m_{01}(z)+m_{11}(z)\}g_{11\text{-}11}(v)a_1m_{10}(L-z)P_r \qquad \text{Formula 14}$$

Figure 3:
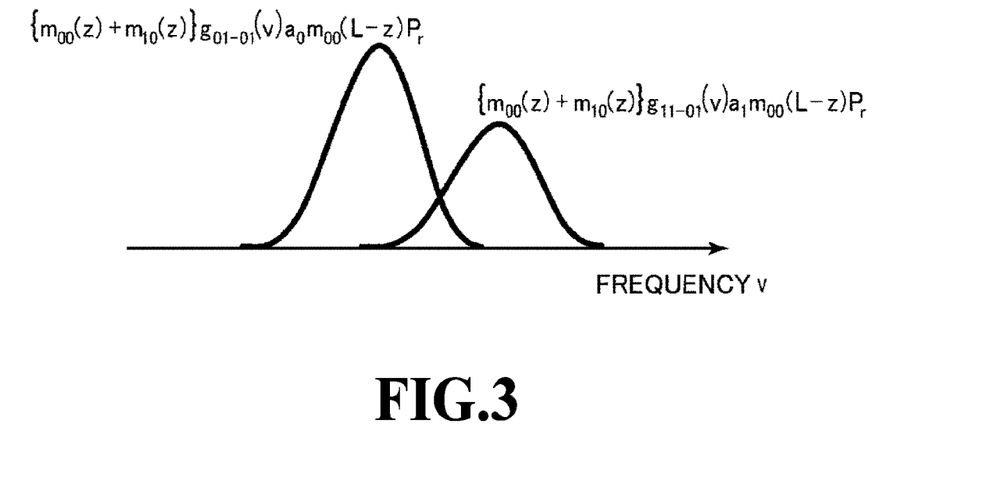
FIG. 3 is an example of observation of a Brillouin gain spectrum of pump light with an amplitude a0 in an LP01 mode at a measurement point according to the embodiment of the present invention.

Therefore, the Brillouin gain spectra of the probe light at the measurement points in the LP01 mode are expressed by Formulas 5 and 11, and are shown FIG. 3. Also, the Brillouin gain spectra of the probe light at the measurement points in the LP11 mode are expressed by Formulas 8 and 14, and are shown FIG. 4.

In reality, the probe light has both amplitudes $b_0$ and $b_1$ at the measurement points. Therefore, the sum of the spectra shown in FIGS. 3 and 4 can be obtained through measurement. Each of the pump light and the probe light has amplitudes in two modes. Therefore, as a result of the pump light and the probe light interacting with each other, they have three spectrum peaks, namely $v_{01\text{-}01}$, $v_{01\text{-}11}$, and $v_{11\text{-}11}$. Formula 5 indicates a gain profile with a peak at $v_{01\text{-}01}$, and Formula 14 indicates a gain profile with a peak at $v_{11\text{-}11}$. Formulas 8 and 11 mean that gain profiles with peaks at $v_{01\text{-}11}$ overlap each other on the frequency axis.

Here, attention is paid only to the amplitude of the peak at $v_{01\text{-}01}$ of the three spectrum peaks, using the feature that the spectra can be separated from each other on the frequency axis. However, a Brillouin gain spectrum has a width. Therefore, the frequency band of $v_{01\text{-}01}$ is affected by the intensity of portions of $v_{01\text{-}11}$ and $v_{11\text{-}11}$. If light that has undergone interaction is demultiplexed by a mode selection and multiplexing/demultiplexing means (the mode selection and multiplexing/demultiplexing means 17 in FIG. 1) and only the LP01 mode is selected on the receiver side, the following formula 15 can be obtained.

Formula 15

$$A(z_1) = m_{00}(z_1)g_{01\text{-}01}(v_{01\text{-}01}, z_1)a_0 m_{00}(L-z_1)P_r +$$
$$X\{m_{00}(z_1)g_{11\text{-}01}(v_{01\text{-}11}, z_1)a_1 m_{00}(L-z_1)P_r +$$
$$m_{01}(z_1)g_{01\text{-}11}(v_{01\text{-}11}, z_1)a_0 m_{10}(L-z_1)P_r\} +$$
$$Y\{m_{01}(z_1)g_{11\text{-}11}(v_{11\text{-}11}, z_1)a_1 m_{10}(L-z_1)P_r\}$$

Formula 15

Here, X and Y (<1) indicate intensity ratios at the frequency of $v_{01\text{-}01}$ of the Brillouin gain spectra with peaks at $v_{01\text{-}11}$ and $v_{11\text{-}11}$.

Similarly, when only the LP11 mode is selected on the receiver side, the following formula 16 can be obtained.

Formula 16

$$B(z_1) = m_{10}(z_1)g_{01\text{-}01}(v_{01\text{-}01}, z_1)a_0 m_{00}(L-z_1)P_r +$$
$$X\{m_{10}(z_1)g_{11\text{-}01}(v_{01\text{-}11}, z_1)a_1 m_{00}(L-z_1)P_r +$$
$$m_{11}(z_1)g_{01\text{-}11}(v_{01\text{-}11}, z_1)a_0 m_{10}(L-z_1)P_r\} +$$
$$Y\{m_{11}(z_1)g_{11\text{-}11}(v_{11\text{-}11}, z_1)a_1 m_{10}(L-z_1)P_r\}$$

Formula 16

Here, if a weakly-coupled optical fiber transmission line with m10 and m01 of approximately 0.1 is envisaged, Formula 17

$$1 > m_{10}(z_1), m_{01}(z_1), m_{10}(L-z_1) >> m_{01}(z_1)m_{10}(L-z_1), m_{10}(z_1)m_{01}(L-z_1)m_{00}(z_1) \approx m_{11}(z_1)$$

is satisfied. In $A(z1)$, the third and fourth terms on the right side can be ignored. Therefore, when attention is paid to the ratio between $A(z_1)$ and $B(z_1)$, the ratio between the Brillouin gains generated in the respective modes can be expressed by Formula 17 based on the above condition.

Formula 18

$$\frac{B(z_1)}{A(z_1)} = \frac{m_{10}(z_1)}{m_{00}(z_1)} + \frac{m_{10}(L-z_1)}{m_{00}(L-z_1)} \frac{Y\{g_{11\text{-}11}(v_{11\text{-}11}, z_1)a_1 m_{10}(L-z_1)\}}{g_{01\text{-}01}(v_{01\text{-}01}, z_1)a_0 +} \\ \frac{X\{g_{01\text{-}11}, (v_{01\text{-}11}, z_1)a_0\} +}{X\{g_{11\text{-}01}(v_{01\text{-}11}, z_1)a_1 m_{00}(L-z_1)\}}$$

Formula 17

Here, if attention is paid to the first term in the right side of Formula 17, it can be seen that all terms other than the elements of the mode coupling matrix at the connection point before the Brillouin occurrence point are canceled out, and the coupling ratio of the LP11 mode to the LP01 mode when the LP01 mode passes through the mode conversion point in the pump light incident direction is indicated.

On the other hand, the second term on the right side of Formula 17 is a measurement error, and can be ignored when X and Y are sufficiently smaller than 1. When X and Y cannot be ignored, the measurement error C(z) is expressed by Formula 18, where Z is a part other than the coupling coefficient of the second term in Formula 17, and the error is crosstalk before the mode conversion point.

Formula 19

$$C(z_1) \cong \frac{m_{10}(L-z_1)}{m_{00}(L-z_1)} Z$$

Formula 18

The propagation property analyzing apparatus according to the present embodiment employs secondary probe light, and reduces the error C by appropriately adjusting the frequency difference between probe light and secondary probe light. The following further describes this secondary probe light.

Figure 4:
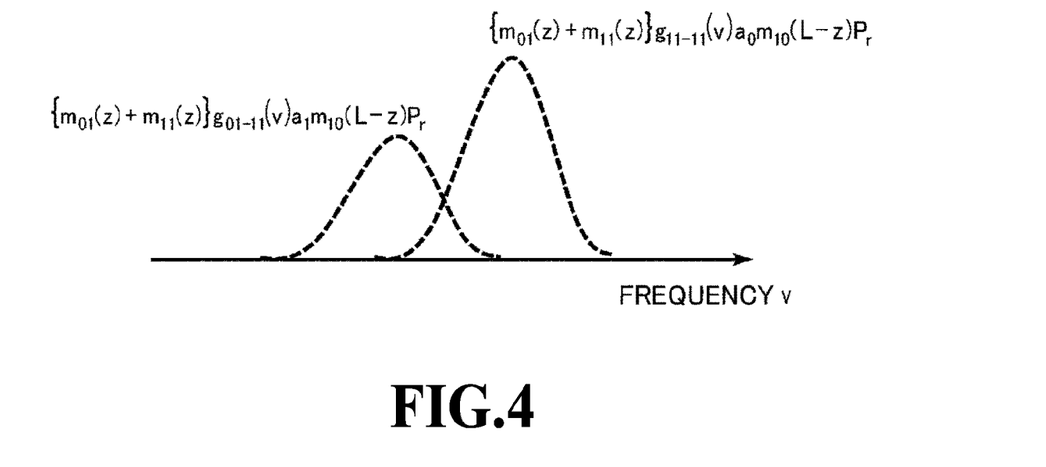
FIG. 4 is an example of observation of a Brillouin gain spectrum of pump light with an amplitude a0 in an LP11 mode at a measurement point according to the embodiment of the present invention.
Figure 5:
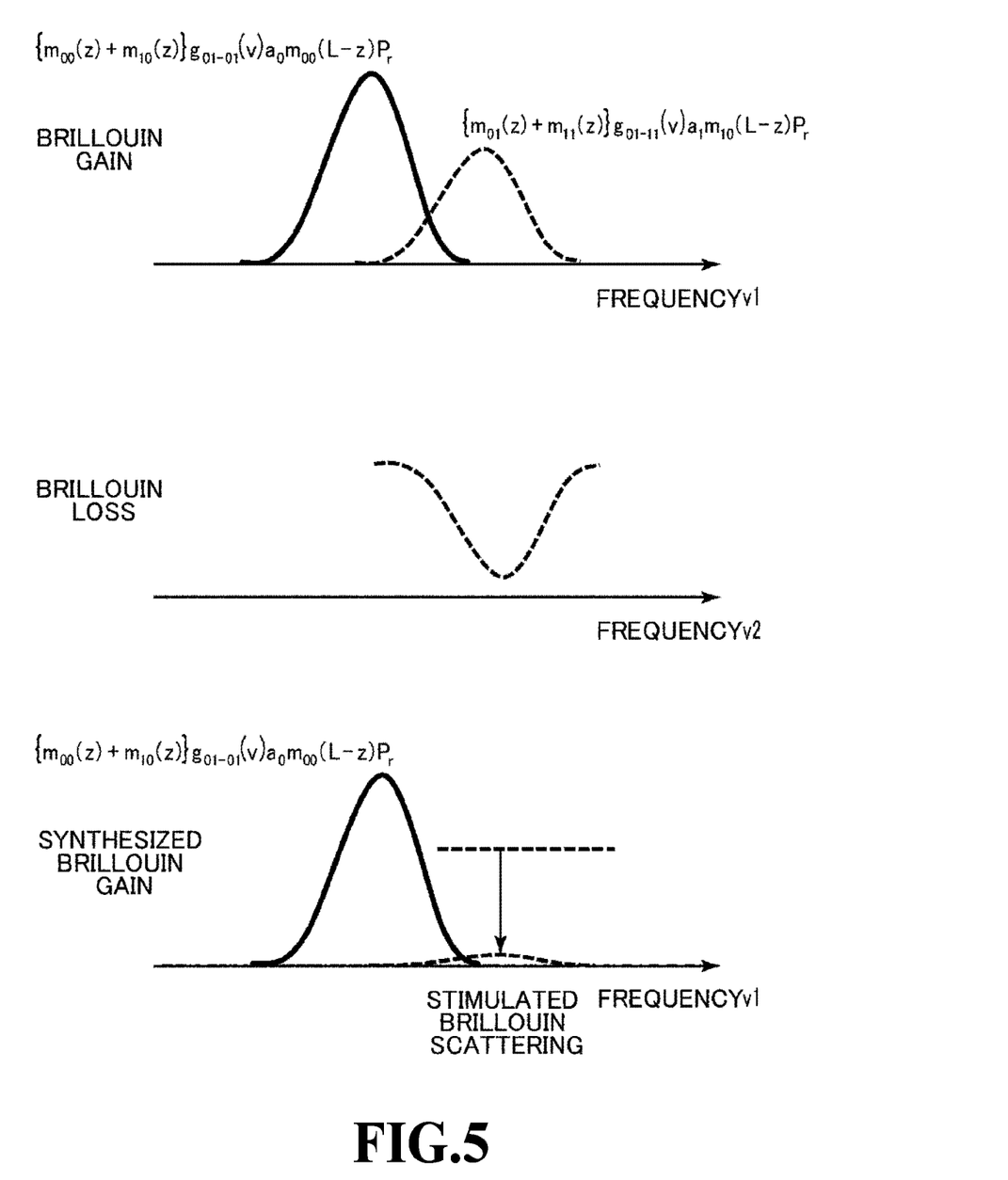
FIG. 5 is a schematic diagram showing a synthesized Brillouin gain generated when secondary probe light is used.

FIG. 5 is a diagram illustrating a synthesized Brillouin gain generated when secondary probe light is used. In FIG. 5, the solid line is a Brillouin gain/loss spectrum generated in a desired mode, and the dotted line is a Brillouin gain/loss spectrum generated in a mode other than the desired mode. Here, in the desired mode, spectra are generated due to the interaction between the LP01 mode and the LP01 mode and the interaction between the LP11 mode and the LP01 mode as shown in FIG. 3. In a mode other than the desired mode, spectra are generated due to the interaction between the LP01 mode and the LP11 and the interaction between the LP11 mode and the LP11 mode as shown in FIG. 4. However, for simplification, only the spectrum generated due to the interaction between the LP01 mode and the LP01 mode and the spectrum generated due to the interaction between the LP01 mode and the LP11 mode are considered.

As shown in FIG. 5, regarding the Brillouin gain, the frequency difference between the probe light and the secondary probe light is set to be the frequency difference between the LP01 mode and the LP11 mode so that the Brillouin gain generated due to the interaction between the LP01 mode and the LP11 mode is reduced.

Here, the Brillouin gain is reduced due to the Brillouin loss phenomenon. A Brillouin loss means a decrease in the pump light intensity when light energy is transferred from the pump light to the probe light when the Brillouin interaction occurs. In a case where the above frequency setting is applied, in the Brillouin interaction between the probe light and the secondary probe light, the probe light acts as pump light, and the secondary probe light acts as probe light. Therefore, a Brillouin loss occurs only due to the interaction between the LP01 mode and the LP11 mode, and the probe light intensity of $m_{10}(L-z_1)P_r$ decreases. As a result, the Brillouin scattering intensity generated at $m_{10}(L-z_1)P_r$ decreases.

The secondary probe light set in this way is incident to the optical fiber under test from the side opposite to the probe light (the same side as the pump light). Thus, the Brillouin gain generated in the mode other than the desired mode can be cancelled out, and an error can be prevented from occurring due to crosstalk.

The secondary probe light can be generated not as continuous light but as pulses adjusted so as not to overlap with the pump light. This is because, if the secondary probe light is incident as continuous light, not only $m_{10}(L-z_1)P_r$ but also $m_{10}(z_1)P_r$ to be obtained is reduced.

Figure 6:
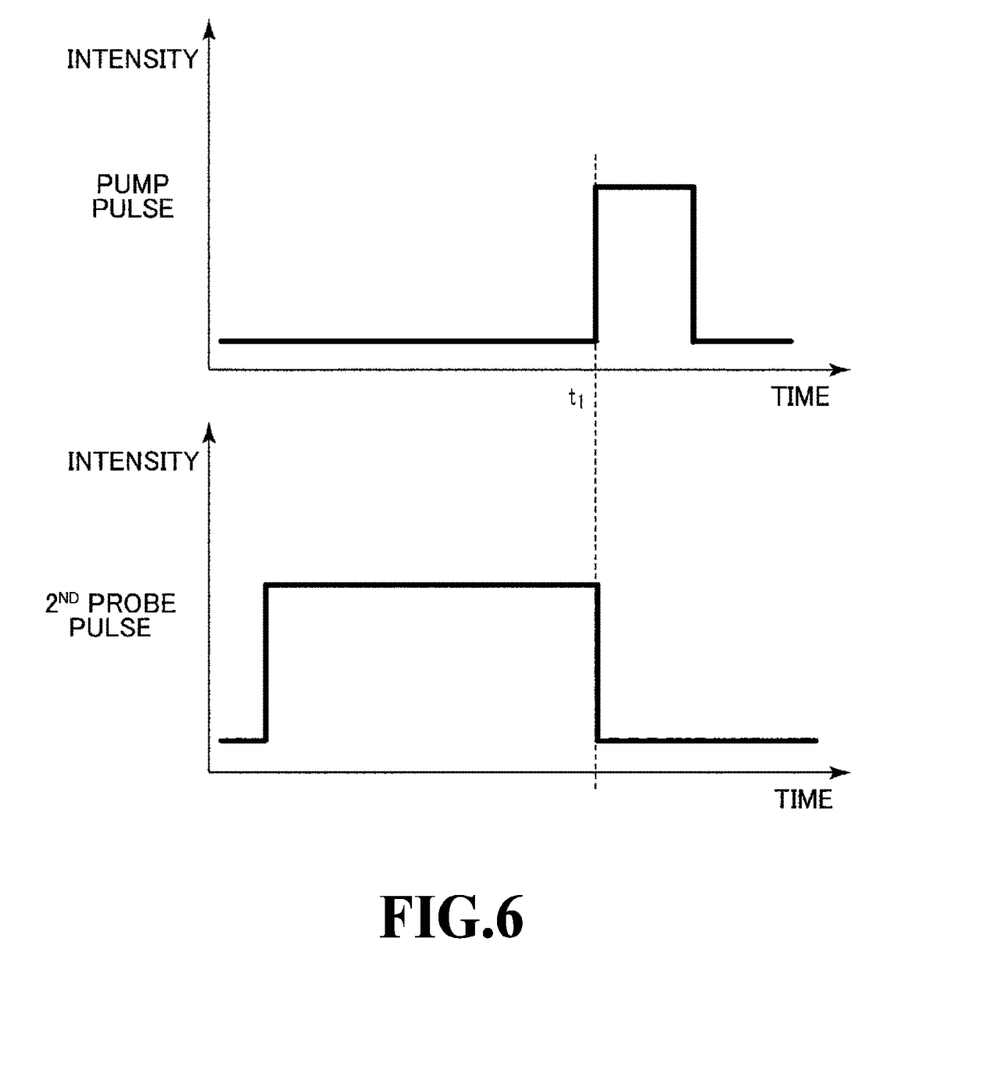
FIG. 6 is an example of pulse generation regarding a pump pulse and a secondary probe pulse.

FIG. 6 shows an example of formation of a pump light pulse and a secondary probe light pulse. As shown in FIG. 6, a pump light pulse and a secondary probe light pulse are set so that the output of each pulse switches to ON or OFF at pump incident time t1. With this setting, the probe light is affected by the interaction with the secondary probe light (a Brillouin loss) only before the time when the probe light and the pump light collide with each other. That is, it is possible to reduce only the probe light intensity $(m_{10}(L-z_1)P_r)$ on the probe light incident-side of the position where the pump light and the probe light collide with each other. Therefore, it is possible to prevent $m_{10}(z_1)P_r$ to be obtained from decreasing.

As described above, by inputting the secondary probe light to the optical fiber under test from the same side as the pump light, it is possible to prevent an error from occurring due to crosstalk, and by performing analysis through Brillouin time domain analysis (BOTDA), it is possible to grasp the coupling state at the mode conversion point.

By performing a similar analysis in a case where the probe light in the LP11 mode is input, it is possible to obtain the coupling ratio of the LP01 mode to the LP11 mode when the LP11 mode passes through the mode conversion point in the pump incident direction.

As described above, if there is a mode conversion point such as a connection point in the middle of an optical fiber, probe light affected by the mode conversion point is analyzed as described above using the stimulated Brillouin scattering phenomenon occurring on the proximal end-side relative to the mode conversion point. Thus, it is possible to grasp the state of mode coupling. In order to grasp the coupling state in the lengthwise direction of the transmission line of the optical fiber under test, it is possible to consider a model (M1, M2, . . . , Mn) in which an infinite number of mode couplings M described above consecutively occur in the lengthwise direction. If the mode excitation state at the input end of the transmission line of the optical fiber under test and the mode coupling ratio in the mode selection and multiplexing/demultiplexing means are known, it is possible to evaluate the distribution of the coupling state along the entire transmission line of the optical fiber under test.

Although a mode multiplex transmission line that has two modes is described in the above embodiment, a mode multiplex transmission line that has three or more modes may be employed. In such a case, although the number of formulas increase, it is possible to grasp the mode coupling state in a similar manner.

Unlike NPL 1, the propagation property analyzing apparatus according to the present embodiment can separate the phenomena that occur in the respective modes on the frequency axis by utilizing stimulated Brillouin scattering. Therefore, there is no influence of Fresnel reflected light in the optical fiber under test, and no special means is required to remove the Fresnel reflected light. In this regard, the propagation property analyzing apparatus has the same advantage as NPL 2.

Furthermore, it is possible to reduce $C(z_1)$, which is an error that occurs in NPL 3, by using the probe light and the secondary probe light. Therefore, it is possible to accurately measure the propagation properties.

Furthermore, in a mode multiplex optical fiber transmission line that multiplexes a plurality of modes, even when stimulated Brillouin scattering spectra in the respective modes of the optical fiber under test overlap each other, it is possible to accurately grasp the mode coupling ratio at the mode conversion point without being affected by the light propagation direction dependence.

REFERENCE SIGNS LIST

11 Laser light generation means
12 Mode selection means
13 First optical frequency control means
14 Second optical frequency control means
15 First light pulse formation means
16 Second light pulse formation means
17 Mode selection and multiplexing means
18 Optical filter
19 Light receiving means
21 Digitization processing means
22 Numerical calculation means
F Optical fiber under test

The invention claimed is:

1. A propagation property analyzing apparatus that analyzes propagation properties of a few-mode optical fiber that multiplexes a plurality of modes, which is an optical fiber under test, in a lengthwise direction thereof, through Brillouin time domain analysis, the propagation property analyzing apparatus comprising:
   means for inputting probe light in a desired mode from one end of the optical fiber under test;
   first optical frequency control means for outputting pump light having a frequency difference equivalent to a Brillouin frequency shift in the desired mode, relative to the probe light;
   first light pulse formation means for forming light pulses from the probe light;
   second optical frequency control means for outputting second probe light having a frequency difference equivalent to a Brillouin frequency shift in an other mode different from the desired mode, relative to the probe light;
   second light pulse formation means for forming light pulses from the second probe light; and
   mode selection and multiplexing/demultiplexing means for inputting, from an other end of the optical fiber under test, the light pulses of the probe light in the desired mode and the light pulses of the second probe light in the other mode respectively.

2. The propagation property analyzing apparatus according to claim 1, wherein the mode selection and multiplexing/demultiplexing means separates a component in the desired mode and a component in the other mode from the probe light that propagates through the optical fiber under test and is output from the other end, and receives the components; and
   wherein the propagation property analyzing apparatus further comprises analyzing means for analyzing, in a time domain, Brillouin gain spectra observed for each of components in the respective modes obtained by the mode selection and multiplexing/demultiplexing means, wherein the analyzing means obtains the propagation properties of the few-mode optical fiber at a given point of the optical fiber under test, based on the Brillouin gain spectra for each of components in the respective modes.

3. The propagation property analyzing apparatus according to claim 2, wherein the analyzing means calculates a mode coupling ratio of the few-mode optical fiber based on a Brillouin gain intensity ratio of the Brillouin gain spectra observed for each of components in the respective modes obtained at the same frequency.

4. The propagation property analyzing apparatus according to claim 1, wherein the second light pulse formation means stops a pulse output at incident time t1 of the light pulses of the pump light.

5. The propagation property analyzing apparatus according to claim 2, wherein the second light pulse formation means stops a pulse output at incident time t1 of the light pulses of the pump light.

6. A propagation property analyzing method for analyzing propagation properties of a few-mode optical fiber that multiplexes a plurality of modes, which is an optical fiber under test, in a lengthwise direction thereof, through Brillouin time domain analysis, the propagation property analyzing method comprising the steps of: inputting probe light in a desired mode from one end of the optical fiber under test;

inputting a light pulse that is in the desired mode and that has a frequency difference equivalent to a Brillouin frequency shift in the desired mode, relative to the probe light, from an other end of the optical fiber under test, as pump light corresponding to the probe light; and inputting a light pulse that is in an other mode different from the desired mode and that has a frequency difference equivalent to a Brillouin frequency shift in the other mode, relative to the probe light, as secondary probe light corresponding to the probe light, from the other end of the optical fiber under test.

\* \* \* \* \*